Patented July 7, 1936

2,046,886

UNITED STATES PATENT OFFICE 2,046,886

FLEXIBLE ARTICLE

Daniel E. Strain, Wilmington, Del., assignor to E. I. du Pont de Nemours & Company, Wilmington, Del., a corporation of Delaware No Drawing. Application December 29, 1934, Serial No. 759,744

21 Claims. (Cl. 91—68)

This invention relates to new and improved flexible articles and more particularly refers to articles of surprising flexibility, durability and general utility which have present on the surface thereof polymers of methyl methacrylate.

Heretofore coated flexible products having metal, cloth, paper, etc. bases have been made with coating compositions consisting mainly of cellulose acetate, pyroxylin, and certain acrylic acid derivatives. Such processes are exemplified by U. S. Patents 1,580,287, 1,842,093 and 1,842,640; and British Patents 371,812, 373,233, 373,947 and 387,736. Despite the tremendous amount of work which has been done in this art the best products are at the present time far from satisfactory. They are subject to many disadvantages, a few of which are for example, that upon aging their coating becomes brittle, decomposes, and separates from the base. Furthermore, the relatively fragile nature of the coating composition requires such articles to be handled with extreme care, particularly if they have been used for any considerable period of time. Likewise, the ultra-violet transmitting properties of such articles are markedly inferior to those of the products hereafter described.

It is an object of this invention to prepare articles which overcome the aforementioned defects and combine both flexibility and durability. An additional object is to coat flexible articles of organic or inorganic origin with certain plastics in such manner that the resulting product is capable of transmitting appreciable amounts of ultra-violet light, even after extended periods of use. A still further object is to devise a plastic which will follow the expansion and contraction of a metallic mesh base without separating or disintegrating therefrom. A still further object is to produce coated screening having a much longer life than any heretofore known in the art. A still further object is to produce products comprising a flexible wire mesh embedded in a plastic material which protects said mesh from the elements and which at the same time adheres thereto in a tenacious and highly satisfactory manner for extended periods of time. Additional objects will become apparent from a consideration of the following description and claims.

These objects are attained according to the herein described invention which broadly comprises treating a flexible base material with a plastic containing as one constituent thereof preferably polymerized methyl methacrylate. In a more restricted sense this invention pertains to the coating of flexible bases of either organic or inorganic origin with a plastic material containing polymerized methyl methacrylate. In its preferred embodiment this invention is directed to the production of flexible articles comprising a wire mesh base embedded in or coated with a plastic composition containing polymerized methyl methacrylate.

The invention may be more readily understood by a consideration of the following illustrative examples:

Example 1

A screen composed of woven oval wires was passed through a solution of the following composition:

|  | Grams |
|---|---|
| Polymerized methyl methacrylate | 100 |
| Methoxy ethyl phthalate | 22.5 |
| Triphenyl phosphate | 18.75 |
| Dibutyl phthalate | 8.75 |
| Methyl acetone | 700.00 |

The solvent was evaporated from the treated article, leaving a flexible coated material having a wire mesh base. This article was then subjected to accelerated weathering conditions. At the end of 1825 hours the product still retained its flexibility, the plastic coating clung tenaciously to the wire base, and no holes nor deterioration were apparent. Moreover, the heat insulating properties of the product were quite satisfactory.

When the above experiment was repeated, substituting 100 grams of cellulose acetate for the same amount of methyl methacrylate in the composition given, the coated product had deteriorated to a condition where it was no longer serviceable after 800 hours of accelerated weathering. At the end of this period of time the plastic had separated from the wire mesh base, the coated article contained numerous holes of varying sizes and had lost a great portion of its plastic coating.

Example 2

Example 1 was repeated using as the coating composition a solution having the following formulation:

| | Grams |
|---|---|
| Polymerized methyl methacrylate | 100 |
| Diethyl phthalate | 18 |
| Triphenyl phosphate | 15 |
| Dibutyl phthalate | 7 |
| Methyl acetone | 700 |

Under accelerated weathering conditions for 1825 hours this product showed surprising durability. It not only retained its flexibility but was entirely free from holes or cracks in the plastic coating.

When 100 grams of cellulose acetate were substituted for the corresponding amount of methyl methacrylate in the above formula, the product was completely destroyed after weathering for 552 hours. Likewise, the amount of ultra-violet light transmitted was much less than in the case of the preceding product.

In these experiments the weathering conditions, base material, and weight of coating on the various samples were practically identical. From the results it was apparent that coating a wire mesh with a plastic containing polymerized methyl methacrylate resulted in the production of a much more satisfactory product than where cellulose acetate was used in the coating composition. It is also to be noted that at the termination of the experiments the articles coated with methyl methacrylate compositions were still serviceable, while those coated with cellulose acetate compositions had completely disintegrated, and this despite the fact that the former had been subjected to weathering for from two to three times as long as the latter.

Upon repeating the preceding experiments utilizing in place of polymerized methyl methacrylate polymers of methyl acrylate or acrylic acid the results were noticeably inferior. Upon aging, these plastics became brittle and separated from the base material in a much shorter time than when they contained polymers of methyl methacrylate. The same relatively unsatisfactory behavior was noticed when polymers of ethyl methacrylate or ethyl acrylate were substituted for polymerized methyl methacrylate. However, a mixture of polymerized methyl methacrylate with polymers of one or more of the aforementioned acrylic acid derivatives resulted in the production of articles which were surprisingly more satisfactory than if the polymerized methyl methacrylate had been omitted therefrom.

Example 3

A sample of methyl methacrylate was polymerized by mixing with 0.5% by weight of benzoyl peroxide and heating the mixture at 100° C. for four hours. A white amorphous solid was obtained. This polymer was refluxed with acetone, in the ratio of 5 parts of the polymer to 95 parts of acetone, until the polymer was completely dissolved. When the solution was cool it was used to impregnate an 80/60 cotton fabric. The cloth was then run through squeeze rolls to remove excess solution and to insure an even distribution of the resin. The solvent was evaporated and the cloth ironed. An unusually white, glossy finish was obtained. The fabric was much fuller and stiffer than the original. Boiling for one-half hour in 0.5% soap solution had no apparent effect on the finish.

Example 4

A tough pliable, water-resistant product was produced by coating porous paper prepared from artificially crinkled fiber, for example, in accordance with the instructions of U. S. Patent 1,857,100. A sheet of the aforementioned porous paper 0.033 inch thick, with a kerosene absorption of 295%, was impregnated with a 10% aqueous emulsion of methyl methacrylate polymer. The excess emulsion was squeezed out so that the weight increase due to the solids absorbed was approximately 33%. Drying was then accomplished by passing the sheet over a steam heated drum under the pressure of a canvas belt. The dried product was subsequently pressed between amalgamated tin plates at elevated temperature. The product was very satisfactory, being water-resistant, tough and pliable.

If a more pliable sheet is desired it may be obtained by incorporating a plasticizer or mixture of plasticizers with the methyl methacrylate polymer. For instance, the incorporation of 15 parts of dibutyl phthalate with the methyl methacrylate polymer in the above example results in the production of a more pliable sheet.

These coated paper products may be used for a variety of purposes, a few of which are referred to in the aforementioned Patent 1,857,100.

Example 5

Glassine and "grease proof" paper were coated with polymerized methyl methacrylate by immersion in a toluol solution thereof, stripping off excess solution with steel rods, and drying 2 minutes at 90° C., then at 65° C. for 24 hours. The coated glassine paper (3.0 lbs. coating per 3000 sq. ft.) was much more transparent, and had better gloss and water repellency than uncoated glassine. The "grease proof" paper coated with methyl methacrylate was much more grease resistant than the uncoated paper. Thus, a piece of "grease proof paper" coated on both sides with 9.5 lbs. of methyl methacrylate per 3000 sq. ft. did not fail in the standard turpentine test for over 15 days, whereas the uncoated paper failed in this test in 51 minutes. (The turpentine test is a standard test used in the paper trade, and consists essentially in placing upon the piece of paper to be tested 20 grams of a mixture of 100 grams pine sawdust and 260 grams of turpentine, covering with a watch glass, and observing the length of time required for the turpentine to penetrate the paper).

Example 6

A cast film 0.002" thick, containing methyl methacrylate and dibutyl phthalate in the ratio of 3:1 was attached to vegetable parchment paper by application of heat and pressure in a hydraulic press. The coated paper was subjected to the turpentine test as in Example 5, along with uncoated vegetable parchment, and was found to fail initially in 16 hours as compared with 10 minutes for the uncoated paper.

Example 7

Glassine paper was coated (as in Example 5) with an approximately 20% solution of methyl methacrylate and dibutyl phthalate (5:3). After drying, the coated paper (approximately 3.0 lbs. coating per 3000 sq. ft.) was found to have much better transparency, gloss, water repellency, and "feel" than did uncoated glassine. In addition it was found that the coated papers did not stick together appreciably when stored at 120° F., while methyl acrylate coated glassine paper stuck together badly when stored at 120° F.

In the foregoing examples (4–7), papers were used such as vegetable parchment, grease proof (which is a modified vegetable parchment), and glassine, all of which were coated with films comprising methyl methacrylate resin. However, any type paper can be satisfactorily coated with this resin. The more porous papers will require more coating because part of such coating will penetrate into and be absorbed by the paper, whereas on a non-porous paper like glassine, the coating penetrates only slightly and lies on top of the paper surfaces almost entirely.

It is to be understood that the aforementioned examples are illustrative merely of the great many products and processes of producing such products which are comprised within the scope of the present invention. In place of partially or completely polymerized methyl methacrylate it is possible to use mixtures of such resin with other derivatives of acrylic acid. Moreover, coating compositions wherein methyl methacrylate polymers are admixed with pyroxylin or other well known resins are also contemplated herein. For optimum results it should be pointed out that the presence of methyl methacrylate polymers is advisable, other derivatives of the acrylic acid series ordinarily being greatly inferior thereto.

Although coated flexible articles containing methyl methacrylate polymers in the coating composition are surprisingly superior to articles coated with other polymerized derivatives of acrylic acid, nevertheless these latter resins are frequently superior to pyroxylin or related prior art plastics. The aforementioned polymerized derivatives of acrylic acid have in particular been found to be advantageous in coating flexible articles when they are used in admixture with appreciable amounts of methyl methacrylate polymers. These derivatives are, for example, ethyl methacrylate, methyl acrylate, ethyl acrylate, etc.

Methyl methacrylate as well as chemically related derivatives of acrylic acid may readily be polymerized to form flexible resinous materials by treatment according to the processes designed for polymerizing organic vinyl esters and other hydrocarbon compounds or derivatives thereof. A polymerization process which is of particular efficacy is one wherein the material to be polymerized is treated with an agent capable of giving off oxygen at somewhat elevated temperatures. For instance, methyl methacrylate may be treated with oxygen, organic peroxides, ozonides, or other agents capable of giving off oxygen at a temperature of say 60–100° C. The presence or absence of a solvent or diluent is optional in such polymerization reaction. Since this reaction is strongly exothermic it is usually advisable to maintain cooling devices within the polymerization chamber.

Flexible bases which may be coated with the resinous compositions described herein may be of either organic or inorganic origin. A representative list of such bases is: wire meshes, made of iron, or other metal or alloy, flexible sheets of aluminum, or other metal or alloy, cotton, jute, linen, wool, rubber, silk, either artificial or natural, regenerated cellulose, teal, duck, leather, paper, porous paper prepared from artificially crinkled fibers, bibulous paper, etc. The aforementioned and related flexible bases may be in the form of sheets, filaments, woven articles, etc. Such bases or the numerous additional bases suggested thereby may be passed through solutions containing methyl methacrylate in polymerized and/or unpolymerized condition and/or in admixture with other resins or plastics. Likewise, the methyl methacrylate compositions may be formed into plastic sheets, which may then be attached to the flexible base material by the application of heat and/or pressure, by means of cement or by some other related method of causing adhesion between the base member and a coating material. Additional methods of applying the aforementioned plastics to a base member are to produce the plastic material in the form of a powder, thereafter applying a relatively uniform layer of said powder to the base material, and finally join the materials by the application of heat; or by passing the base member through hot melts of the resin, or solutions of the resin in organic solvents, or aqueous emulsions of the resin.

While the present invention is directed broadly to numerous coated compounds or laminated articles it is of particular advantage in the production of coated wire mesh materials. The production of these articles is frequently considered to be a relatively simple matter by one not thoroughly familiar with the art. However, there are many factors of extreme importance which must be observed in producing such articles. These factors are little known and undoubtedly explain many of the faults which are attributed to coated wire mesh articles now available to the public. For example, the coating material must cling tenaciously to the underlying metallic base, and this regardless of temperature. In other words, the coating material must be capable of expanding and contracting with the base without separating therefrom in whole or in part. Not only must the coating composition possess the aforesaid properties but it must also be capable of resisting ordinary and extraordinary weather conditions. It should not become brittle upon exposure to the summer sun or the blizzards of winter. It must not be affected by rain or the mild acids present in the atmosphere. It is essential that it be capable of withstanding rough handling. All of these conditions must be observed in producing a satisfactory product.

While many well known plastics may possess some of these properties, it has been found that none possess these properties to the required extent. The plastics described herein possess these properties to a surprising extent and are therefore, much more desirable from a commercial standpoint. While the various plastics comprised within the scope of this application, in general, possess these properties to a greater extent than cellulose acetate, which was customarily used for this purpose in the past, it has been found that one plastic in particular combines these properties in such manner that it is outstandingly superior to any of the remaining compositions. This pronounced superiority is quite surprising in view of the fact that members of a given chemical class would naturally be expected to possess properties which rather closely approximate one another, or which vary by a predictable amount. However, while the acrylic acid derivatives, with the exception of methyl methacrylate, have been found to vary from one another in the enumerated properties by a relatively small amount there is a tremendous gap between the properties of methyl methacrylate and its closest homologue, ethyl methacrylate. Because of this fact, it is to be understood that methyl methacrylate is the preferred resin for use herein, particularly in the coating of wire mesh materials. Although the other plastics referred to herein are capable of use it is preferable to select methyl methacrylate, or at least mix portions of such compound with the other homologues thereof.

When selecting the wire mesh to be coated considerable latitude may be exercised. For instance, the wires may be woven or may be soldered, brazed or welded together. Furthermore, these wires may be dull galvanized or otherwise treated and may be produced from copper, iron, steel or any other metal or metal alloy which is capable of being fabricated in the form of a wire mesh. Before or after fabrication the metal or metal alloys may be hot or cold galvanized or otherwise chemically and/or mechanically treated. For optimum results, it is ordinarily advisable to select wire meshes the individual wires of which in whole or in part have a substantially oval cross section. This type of cross section has been found to be more satisfactory in a base material than round or flat wire. However, the invention is not restricted thereto since it is equally applicable when round and/or flat wires are used in place of oval wire or in combination therewith. Also, it is to be understood that the invention is not restricted to any particular form of wire, manner of weaving or joining individual wires, nor to the chemical or physical composition of such materials, since it is contemplated that it may be applied to all wire meshes regardless of how the aforementioned characteristics may vary.

In producing coating compositions it is frequently admisable to incorporate one or more plasticizers with the methyl methacrylate polymer or related coating compositions. Plasticizers exert, in general, a profound influence upon the properties of the resulting plastics, and consequently upon the properties of the articles coated with such plastics. A few representative examples of plasticizers which may be used in conjunction with the aforementioned resins are: phthalates such as ethyl-, diethyl-, propyl-, isopropyl-, butyl-, dibutyl-, isobutyl-, cyclohexyl-, or benzyl-phthalate, or phthalates of the mixed type such as cyclohexyl-butyl-, benzyl-butyl-, etc.; esters of dibasic acids such as esters of succinic, fumaric, tartaric, adipic, and sebacic acids; esters of monobasic acids such as esters of levulinic, lauric, benzoic, benzoyl-propionic, and benzoyl-benzoic acids; esters of polyhydric alcohols such as the esters of glycol and glycerol (for example, glycol-benzoate, triacetin, etc.); substituted toluene sulfonamides such as ethyl-p-toluene-sulfonamide; substituted amides such as tetraethyl-phthalamide, tetrabutyl-succinamide, etc.; cyclic ketones such as camphor and beta-naphthanone; lactones such as phthalide; hydrocarbons such as dixylyl-ethane; halogenated hydrocarbons such as chlorinated diphenyl compounds; ethers such as dicresoxyethyl-ether; and also non-drying or semi-drying oils.

When selecting plasticizers for use in coating compositions, and in particular in coating compositions for wire mesh, it is advisable to take into consideration several features which are little understood or appreciated. If these considerations are duly observed coating compositions will be obtained which are of surprising utility. First of all, a mixture of two and preferably three or more plasticizers is generally advisable. By utilizing a multiplicity of plasticizers the resulting plastic may have imparted thereto certain properties which are possessed by no individual plasticizer. These desirable properties are chiefly, low volatility, and solvent or good swelling properties for the material to be plasticized.

The advisability of selecting plasticizers having these characteristics is probably due to the fact that low volatility decreases the tendency of individual components to evaporate and thereby destroy the homogeneity of the product. Likewise, the presence of a solvent or good swelling agent tends to render the final mixture compatible, and results in the production of a homogeneous durable article.

Each of these properties may be possessed by an individual plasticizer. However, by selecting plasticizers which predominate in individual properties it is possible to produce a composition which possesses the necessary combination of properties to the extent required by the particular use for which the coated product is intended. The aforementioned properties may vary in their relative importance in accordance with the objects in view. The relative importance of the individual properties is therefore one of the chief considerations governing the selection of plasticizers for the herein described coating compositions.

The property of low volatility may be imparted to a plastic, for example, by incorporating therein phosphate plasticizers in general, and in particular triortho-phenyl-phenyl-phosphate, triphenyl-phosphate and thiotriphenyl-phosphate. Other well known phosphate plasticizers which have been found to possess this property and which are suitable for use herein are thiotricresyl-phosphate, tricresyl-phosphate, tribenzyl-phosphate, etc.

Plasticizers which, among others, are particularly useful in imparting solvent or swelling properties to a plastic composition are the various phthalates, especially alkoxy-ethyl-phthalates and dialkyl-phthalates, such as methoxy-ethyl-phthalate, ethoxy-ethyl-phthalate, dimethyl-phthalate, dibutyl-phthalate, etc. These properties may likewise be imparted to the plastic by well known plasticizers such as alkoxy-ethyl esters and mixed phthalyl and glycollic esters as, for example, diethylene-glycol-propionate and butyl-phthalyl-butyl-glycollate.

Plasticizers which have been found to be especially advantageous for a variety of widely differing uses are the phosphates and phthalates, and in particular mixtures of phosphates and phthalates. Members of the aforementioned classes which are described herein are customarily of optimum value although it is to be understood that the use of other plasticizers is contemplated.

A few illustrative mixtures of plasticizers, embodying the aforementioned important considerations, which may be incorporated with the compositions previously described are:

| | |
|---|---|
| 25 Methoxyethyl phthalate<br>15 Triphenyl phosphate | 16 Diethyl phthalate<br>16 Triphenyl phosphate<br>8 Tricresyl phosphate |
| 15 Methoxyethyl phthalate<br>15 Thiotriphenyl phosphate<br>5 Ethoxyethyl phthalate<br>5 Dibutyl tartrate | 18 Diethyl phthalate<br>15 Triphenyl phosphate<br>7 Dibutyl phthalate |
| 18 Diethyl phthalate<br>15 Butyl phthalyl butyl glycollate<br>7 Dibutyl tartrate | 18 Diethyl phthalate<br>15 Methyl phthalyl ethyl glycollate<br>7 Dibutyl tartrate |
| 18 Diethyl phthalate<br>15 Triphenyl phosphate<br>7 Tricresyl phosphate | 18.0 Diethyl phthalate<br>7.5 Triphenyl phosphate<br>7.5 Tricresyl phosphate<br>7.0 Dibutyl phthalate |
| 18 Diethyl phthalate<br>22 Dibutyl tartrate | 16 Methoxyethyl phthalate<br>12 Triphenyl phosphate<br>12 Camphor |
| 18 Dibutyl tartrate<br>15 Triphenyl phosphate<br>7 Tricresyl phosphate | 16 Methoxyethyl phthalate<br>12 Triphenyl phosphate<br>12 Beta naphthanone |
| 16 Methoxyethyl phthalate<br>12 Triphenyl phosphate<br>12 Phthalide | 18 Dibutyl phthalate<br>22 Dibutyl tartrate |
| 10 Thiotriphenyl phosphate<br>5 Triphenyl phosphate<br>10 Methoxyethyl phosphate<br>10 Diethyl phthalate<br>5 Dibutyl tartrate | 12 Methoxyethyl phthalate<br>5 Triphenyl phosphate<br>10 Thiotriphenyl phosphate<br>6 Dimethyl phthalate<br>7 Dibutyl tartrate |
| 18 Dicyclohexyl phthalate<br>15 Triortho phenyl phenyl phosphate<br>7 Dibutyl tartrate | 9 Dimethyl phthalate<br>10 Thiotriphenyl phosphate<br>5 Triphenyl phosphate<br>9 Dibutyl tartrate<br>7 Dibutyl phthalate |
| 18 Dibutyl tartrate<br>15 Triphenyl phosphate<br>7 Dibutyl phthalate | 17 Dibutyl phthalate<br>8 Ethyl phthalyl ethyl glycollate<br>15 Triphenyl phosphate |
| 10 Thiotriphenyl phosphate<br>5 Triphenyl phosphate<br>10 Diethyl phthalate<br>15 Cyclonol | 18 Cyclonol<br>15 Thiotriphenyl phosphate<br>7 Ethoxyethyl phthalate |
| 18 Methoxyethyl phthalate<br>15 Triphenyl phosphate<br>7 Ethoxyethyl phthalate | 18 Methoxyethyl phthalate<br>15 Thiotriphenyl phosphate<br>7 Ethoxyethyl phthalate |
| 18 Methoxyethyl phthalate<br>5 Triphenyl phosphate<br>10 Thiotriphenyl phosphate<br>7 Dibutyl phthalate | 18 Cyclonol<br>15 Thiotriphenyl phosphate<br>7 Methoxyethyl phthalate |
| 16 Diamyl phthalate<br>16 Butoxyethyl phthalate<br>8 Triortho phenyl phenyl phosphate | 18 Cyclonol<br>15 Thiotriphenyl phthalate<br>7 Dibutyl phthalate |
| 10 Methoxyethyl phthalate<br>5 Triphenyl phosphate<br>10 Thiotriphenyl phosphate | 18 Methoxyethyl phthalate<br>5 Triphenyl phosphate<br>10 Thiotriphenyl phosphate<br>7 Dibutyl tartrate |
| 7 Dibutyl phthalate<br>6 Dibutyl tartrate<br>2 Diethyl phthalate | 16 Diamyl phthalate<br>16 Diethylene glycol propionate<br>8 Triortho phenyl phenyl phosphate |
| 18 Methoxyethyl phthalate<br>15 Thiotriphenyl phosphate<br>7 Dibutyl tartrate | 12 Methoxyethyl phthalate<br>5 Triphenyl phosphate<br>10 Thiotriphenyl phosphate<br>6 Dimethyl phthalate<br>7 Dibutyl phthalate |
| 20 Methoxyethyl phthalate<br>10 Thiotriphenyl phosphate<br>5 Triphenyl phosphate<br>5 Dibutyl tartrate | |

It is to be understood that the amount of any individual plasticizer specified above is given merely to indicate its relative proportion with respect to the remaining plasticizers. Moreover, it is contemplated that the plasticizers specifically described herein may be used apart from the particular compositions with respect to which such plasticizers were mentioned.

The above described mixtures of plasticizers have been found particularly advantageous in producing coating compositions utilizing in whole or in part polymerized methyl methacrylate as the resinous material. The amount of resin which may be used in admixture with these plasticizer compositions will naturally vary in accordance with the objects in view. Where coated wire meshes are to be made it is in general advisable to use from 30–60 parts of plasticizer for 100 parts of resin. Where coated textile fibers are to be produced the proportion of plasticizer may be increased up to more than 100 parts of plasticizer for 100 parts of resin. For this latter purpose about equal parts of plasticizer and resin are customarily quite satisfactory. However, it is contemplated that the amount of plasticizer may be increased or decreased within wide limits as the flexibility desired increases or decreases, respectively. Consequently, the aforementioned proportions are not to be construed as a limitation hereon.

Diethylene oxide has been found to be particularly advantageous as a solvent although various other solvents, such as acetone, methyl acetone, toluol, benzol, ethyl acetate, etc. or mixtures thereof may be selected. As in the case of the plasticizer, the particular amount of solvent or mixture of solvents which is selected will depend to a great extent upon the objects in view. For coating purposes it is ordinarily preferable to use sufficient solvent to produce a free-flowing solution. This invention is intended to include the use of any solvent or mixture of solvents which is capable of dissolving the herein described resins with the production of a satisfactory coating composition.

It is contemplated that the aforementioned coating compositions may contain filler, dyes, pigments, etc. These assistants are well known in the plastic art, and need not be described in detail herein. It is also to be understood that numerous penetrating, homogenizing and/or dispersing agents, for example higher fatty alcohols and their derivatives having six or more carbon atoms, may be incorporated with the resin in accordance with the present invention. A few of such alcohols are: octyl, decyl, lauryl, myristyl, cetyl, stearyl, oleyl, ricinoleyl and linoleyl alcohols. Small amounts of the aforementioned or related alcohols and/or other penetrating, homogenizing and/or dispersing agents frequently improve the characteristics of the coating composition. While the presence of such agents is advantageous it is to be understood that they are not considered as essential, but merely as aids in further enhancing the benefits of the present invention.

In applying the described coating compositions to the flexible base material it is to be understood that the resin may be, upon application to said base unpolymerized, partially polymerized or completely polymerized. In processes wherein a continuous coating is to be imparted to a base material it is ordinarily advisable that the methyl methacrylate be at least partially polymerized prior to application to the base. The presence of benzoyl peroxide, and/or additional agents which facilitate polymerization, in said solution is quite helpful in such cases.

Although the present invention is particularly adapted for use in the production of coated wire mesh products a few additional uses will now be described: The production of highly flexible articles of wearing apparel having a continuous coating of plastic material thereon. The coating of sheet material such as bibulous paper, regenerated cellulose, rubber, leather, textiles generally, paper of all types, tin and aluminum foil, etc. Such coated sheet materials have a wide variety of commercial uses. For instance, coated aluminum foil has been found to be valuable for use in protecting foodstuffs, etc. Coated aluminum foil and related products possess a bright lustre and when used for wrapping foodstuffs do not adhere, nor impart a disagreeable odor or taste thereto. In recoating a material which has previously been coated and from which the coating has disintegrated it has been discovered that compositions containing methyl methacrylate polymer alone or in admixture with other resins, as previously described, are quite suitable. Such compositions have been used with satisfactory results to recoat dull galvanized and other types of wire meshes which were previously coated with cellulose acetate, pyroxylin, polymerized vinyl ester resins, etc. the lacquer adhering firmly to both the base material and the old coating composition. These products are also of use in manufacturing or repairing the bodies of airplanes, automobiles, seacraft, etc.

Since these coating compositions are thermoplastic they may be subjected to the various treatments adapted for thermoplastic materials. For example, a piece of textile material coated with methyl methacrylate polymers, in accordance with the previous instructions, may be passed between a heated steel roller and a rubber roller. The product has a pleasing smooth appearance on one side whereas the other side has a rough appearance.

Another use for the herein described invention, which is of particular interest at the present time, is in the manufacture of insulated electrical conductors. Thus, an electrical conductor, such as copper wire, may be effectively insulated by coating with the previously described plastics. For example, the wire may be coated directly with methyl methacrylate polymers; or a fabric or paper wrapper might be impregnated with such polymers and used for insulating the wire. The utility of these plastics for insulating purposes is, however, not confined to electrical insulation since they are also of value as heat insulators.

The present invention permits the production of flexible coated articles having surprising durability and flexibility. By means of this invention it is possible to vary the flexibility of polymerized methyl methacrylate and coating compositions produced therefrom within wide limits. Coated wire meshes of exceptional resistance to weathering and rough handling may be produced. Moreover, many of the described products are of importance where the transmission of appreciable amounts of ultra-violet light is desired. The products are well adapted for heat insulating purposes. Likewise, they are resistant to many chemicals which destroy cellulose acetate and coating compositions heretofore used.

As many apparently widely different embodiments of this invention may be made without departing from the spirit and scope thereof, it is to be understood that the invention is not limited to the specific embodiments thereof except as defined in the appended claims.

I claim:

1. A flexible article which comprises a flexible base material treated with methyl methacrylate polymers.

2. A flexible article composed of a multiplicity of dissimilar materials, at least one of which is a flexible substantially homogeneous base and at least one of which is a plastic containing polymers of methyl methacrylate.

3. A flexible article which comprises a flexible base material the surface of which has present thereon polymerized methyl methacrylate.

4. A flexible article which comprises a flexible base material the surface of which has present thereon a multiple component plastic containing polymerized methyl methacrylate.

5. A flexible article which comprises a flexible base material the surface of which has present thereon polymerized methyl methacrylate plasticized with a mixture of phosphate and phthalate plasticizers.

6. A coated article which comprises a wire mesh base coated with polymerized methyl methacrylate.

7. A coated article which comprises a wire mesh base having present thereon a plastic containing polymerized methyl methacrylate and at least one plasticizer.

8. A coated article which comprises a wire mesh base having present thereon a plastic containing polymerized methyl methacrylate and a multiplicity of plasticizers.

9. A coated article which comprises a wire mesh base having present thereon a continuous coating of a plastic containing polymerized methyl methacrylate plasticized with a mixture of phosphate and phthalate plasticizers.

10. A coated article which comprises a wire mesh base having present thereon a continuous coating of a plastic containing polymerized methyl methacrylate and a multiplicity of plasticizers one of which is dibutyl-phthalate and another of which is triortho-phenyl-phenyl-phosphate.

11. A flexible article which comprises a porous flexible base containing polymers of methyl methacrylate.

12. A flexible article which comprises a flexible cellulosic base treated with polymers of methyl methacrylate.

13. A flexible article which comprises a paper base treated with polymers of methyl methacrylate.

14. An article which comprises a flexible base member having incorporated therewith a plastic containing a polymerized resin characterized in that said polymerized resin consists substantially entirely of polymerized methyl-methacrylate.

15. An article which comprises a wire mesh base having present thereon a continuous coating of a plastic containing a polymerized resin characterized in that said polymerized resin consists substantially entirely of polymerized methyl-methacrylate.

16. An article which comprises a wire mesh base having present thereon a continuous coating of a plastic containing at least one plasticizer and a polymerized resin characterized in that said polymerized resin consists substantially entirely of polymerized methyl-methacrylate.

17. A flexible article which comprises a flexible base having present on the surface thereof a substantially continuous film of a plastic derived from a multiplicity of polymerizable acrylic acid derivatives, one of such derivatives being methyl methacrylate.

18. The product of claim 17 characterized in that the plastic contains at least one plasticizer.

19. The product of claim 17 characterized in that the plastic contains at least one phosphate plasticizer.

20. The product of claim 17 characterized in that the plastic contains at least one phthalate plasticizer.

21. The product of claim 17 characterized in that the plastic contains a multiplicity of plasticizers, at least one of which is a phosphate plasticizer and at least one of which is a phthalate plasticizer.

DANIEL E. STRAIN.